(12) United States Patent
Trelewicz

(10) Patent No.: US 7,283,265 B2
(45) Date of Patent: *Oct. 16, 2007

(54) RASTER DATA COMPRESSION APPARATUS AND METHOD

(75) Inventor: Jennifer Q. Trelewicz, Superior, CO (US)

(73) Assignee: InfoPrint Solutions Company, Boulder, CO (US)

( * ) Notice: Subject to any disclaimer, the term of this patent is extended or adjusted under 35 U.S.C. 154(b) by 1276 days.

This patent is subject to a terminal disclaimer.

(21) Appl. No.: 09/993,188

(22) Filed: Nov. 14, 2001

(65) Prior Publication Data

US 2003/0090702 A1    May 15, 2003

(51) Int. Cl.
*H04N 1/41* (2006.01)
*G06F 3/12* (2006.01)

(52) U.S. Cl. .............................. 358/1.15; 358/426.04; 358/426.12; 358/426.13

(58) Field of Classification Search ................ 358/1.9, 358/2.1, 1.15, 539, 426.01, 426.02, 426.04, 358/426.06, 426.13, 426.12; 382/232, 233, 382/239, 244; 341/51
See application file for complete search history.

(56) References Cited

U.S. PATENT DOCUMENTS

| | | | |
|---|---|---|---|
| 5,564,001 A | 10/1996 | Lewis | 715/500.1 |
| 5,596,423 A | 1/1997 | Pritchard | 358/426.05 |
| 5,815,097 A | 9/1998 | Schwartz et al. | 341/51 |
| 6,034,782 A | 3/2000 | Hines | 358/1.14 |
| 6,567,180 B1 * | 5/2003 | Kageyama et al. | 358/1.15 |
| 6,624,761 B2 * | 9/2003 | Fallon | 341/51 |
| 6,744,921 B1 * | 6/2004 | Uchida et al. | 382/185 |
| 6,819,440 B1 * | 11/2004 | Varga et al. | 358/1.13 |
| 7,085,020 B2 * | 8/2006 | Trelewicz | 358/426.13 |

* cited by examiner

*Primary Examiner*—Scott A. Rogers
(74) *Attorney, Agent, or Firm*—Duft Bornsen & Fishman, LLP

(57) ABSTRACT

A plurality of patterns such as solid patterns, edge patterns, half-tone patterns, and verbatim data are losslessly represented in a compressed raster data stream. A pattern selection module selects among the various patterns to provide the best combination of lossless representations according to particular criteria such as storage compactness. A packet formatting module packs multiple pattern identifiers and lossless representations into a packet which may be transmitted compactly. Upon receipt, a packet deformatting module unpacks the pattern identifiers and lossless representations from the packet. After deformatting, a pattern decoding module uses the pattern identifier to activate appropriate pattern generation modules. Each pattern generation module regenerates data according to an indicated pattern to recreate the original raster data.

31 Claims, 14 Drawing Sheets

Example Patterns

| RASTER DATA | PATTERN ID | PATTERN LABEL | PATTERN DATA |
|---|---|---|---|
| 1111111111111111 | Solid | ON | 1 |
| 1110000000000000 | Edge | OFF AT BIT3 | 00011 |
| 1110011111100111 | Half-tone | 75% GRAY | 110000 |
| 1011010000110101 | Verbatim | - | 1011010000110101 |

Fig. 5

| PACKET HEADER 910a | PACKET DATA 920a | DECODED RASTER DATA 930a |
|---|---|---|
| 00 - Solid OFF Pattern | NONE | All Zeros |
| 01 - Solid ON Pattern | NONE | All Ones |
| 10 - Edge Pattern | 0, Edge Position<br>1, Edge Position | Zeros To Edge Position, Ones Thereafter<br>Ones To Edge Position, Zeros Thereafter |
| 11 - No Pattern | Verbatim Raster Data | Verbatim Raster Data |

Fig. 9a

| PACKET HEADER 910b | PACKET DATA 920b | DECODED RASTER DATA 930b |
|---|---|---|
| 0 - Solid Pattern | 0<br>1 | All Zeros<br>All Ones |
| 1 - Other Pattern | 0 | Repeat Last Data Element |
| | 100, Edge Position<br>101, Edge Position | Zeros To Edge Position, Ones Thereafter<br>Ones To Edge Position, Zeros Thereafter |
| | 11, Verbatim Raster Data | Verbatim Raster Data |

Fig. 9b

| PACKET HEADER 910c | PACKET DATA 920c | DECODED RASTER DATA 930c |
|---|---|---|
| 0 - Solid Pattern | 0<br>1 | All Zeros<br>All Ones |
| 1 - Other Pattern | 0 | Repeat Last Data Element |
| | 1, Verbatim Raster Data | Verbatim Raster Data |

Fig. 9c

RASTER DATA COMPRESSION APPARATUS AND METHOD

BACKGROUND OF THE INVENTION

1. The Field of the Invention

The present invention relates to the field of data compression and more particularly, to the field of lossless compression and decompression of bi-tonal raster data.

2. The Relevant Art

Raster data is generated by graphical systems when converting graphical objects into a low-level bitstream appropriate for display and rendering. The generated bitstream is often bandwidth and processor intensive, especially in light of the push for systems with higher resolutions and faster rendering speeds. Many graphical systems and products such as page printers, phototypesetters, and electrostatic plotters have dedicated hardware with specialized and often costly architectures optimized for processing the large amounts of graphical data at high speeds.

While image quality and raster data processing requirements continue to increase, market demand for image-oriented devices and systems has proven to be particularly price sensitive. Manufacturers of these devices and systems are under constant pressure to deliver higher resolution systems at lower prices. As a result of these pressures, product life cycles have been dramatically shortened.

Shortened product life cycles make it difficult for manufacturers to recoup the tooling and marketing costs associated with the introduction of new products. Cost-effective components are leveraged to their maximum capacity and performance. Existing devices and Systems often have little bandwidth or processing capacity available for new features or enhancements. Ideally, additional features and enhancements must fit within the constraints of existing products and thereby increase their product life cycle at no additional materials cost.

Compression and decompression of raster data offers the hope of reducing the bandwidth requirements at a given rendering resolution and increasing the data throughput and rendering resolution attainable over fixed-bandwidth channels. However, compression algorithms are typically complex and require large amounts of memory and processing power. Large dictionaries of reference data or complex mathematical formulas may be used, each of which requires significant computational resources. Compression algorithms often process a relatively large context of data surrounding a data element in order to spot redundancies or patterns within the raster data. Processing large amounts of data increases both the memory requirements and the processing requirements of compression systems.

From the above discussion, it can be seen that it would be beneficial to improve the performance of graphical systems and other data-intensive systems by providing an apparatus and method for compressing and decompressing data using minimal processing resources. Minimizing the complexity of compressing and decompressing data facilitates handling more data with lower cost components. Low complexity compression also facilitates adding additional capability to existing products and systems at little or no additional cost.

OBJECTS AND BRIEF SUMMARY OF THE INVENTION

The apparatus and method of the present invention have been developed in response to the present state of the art, and in particular, in response to the problems and needs in the art that have not yet been fully solved by currently available raster data compression and decompression systems and methods. Accordingly, it is an overall object of the present invention to provide an improved method and apparatus for raster data compression and decompression that overcome many or all of the above-discussed shortcomings in the art.

To achieve the foregoing object, and in accordance with the invention as embodied and broadly described herein in the preferred embodiments, an apparatus and method for data compression and decompression are provided that significantly decrease raster data bandwidth requirements while consuming little processing resources. In the described embodiment, compression of raster data will be described, but it is contemplated that any type of suitable data could be compressed under the present invention.

The raster data compression apparatus in accordance with the invention comprises a number of pattern detection modules. Each pattern detection module detects and losslessly represents a particular type of pattern such as solid patterns, edge patterns, and half-tone patterns. A pattern selection module receives a stream of raster data where redundant patterns are detected and selects the best lossless representation according to particular criteria such as storage compactness. In some cases, the pattern selection module may select the original raster data, referred to as "verbatim" raster data, as the best lossless representation.

A packet formatting module packs a number of iterations of compressed data including a pattern identifier into a packet comprising a packet header and packet data. The packet formatting module is preferably configured to select the best binary representation of the compressed data for a particular application.

Once a packet of data has been compressed and formatted it may then be transmitted or stored efficiently. Upon receipt or retrieval, a raster data decompression apparatus and method of the present invention may deformat and uncompress the raster data.

The raster data decompression apparatus preferably includes a pattern decoding module and one or more pattern generation modules and may include a packet deformatting module. The packet deformatting module works in conjunction with the formatter to use the best binary representation of the compressed data for a particular application. The packet deformatting module unpacks a number of iterations of compressed data including the pattern identifier from a packet header and associated data.

After the deformatting module unpacks data, the pattern decoding module uses the pattern identifier to activate the appropriate pattern generator. Each pattern generation module generates a particular type of pattern such as solid patterns, edge patterns, and half-tone patterns from a corresponding lossless representation, i.e., the pattern data. In addition to the pattern generators, the pattern decoding module may activate a verbatim data transfer module which simply receives and provides the original data in verbatim i.e. uncompressed form.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 is a table illustrating example bi-tonal raster patterns in accordance with the present invention;

FIG. 9 is a set of tables illustrating various raster packet formats in accordance with the present invention.

DETAILED DESCRIPTION OF THE PREFERRED EMBODIMENTS

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software and executed by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Much of the description in this specification uses the term 'activate' to describe the invocation of processing within a functional unit such as a module. Activation may comprise a signal, a semaphore, an event, a procedure call, an interrupt routine or the like. The term 'activate' is congruent with a parallel execution model typical of hardware solutions but also facilitates a serial execution model typical of conventional software systems. Those skilled in the art will appreciate that a variety of invocation mechanisms may be used in computational and control systems and that a schematic flowchart need not be sequentially executed or executed in the same order to be a valid embodiment of an algorithm or process.

Figure 1:
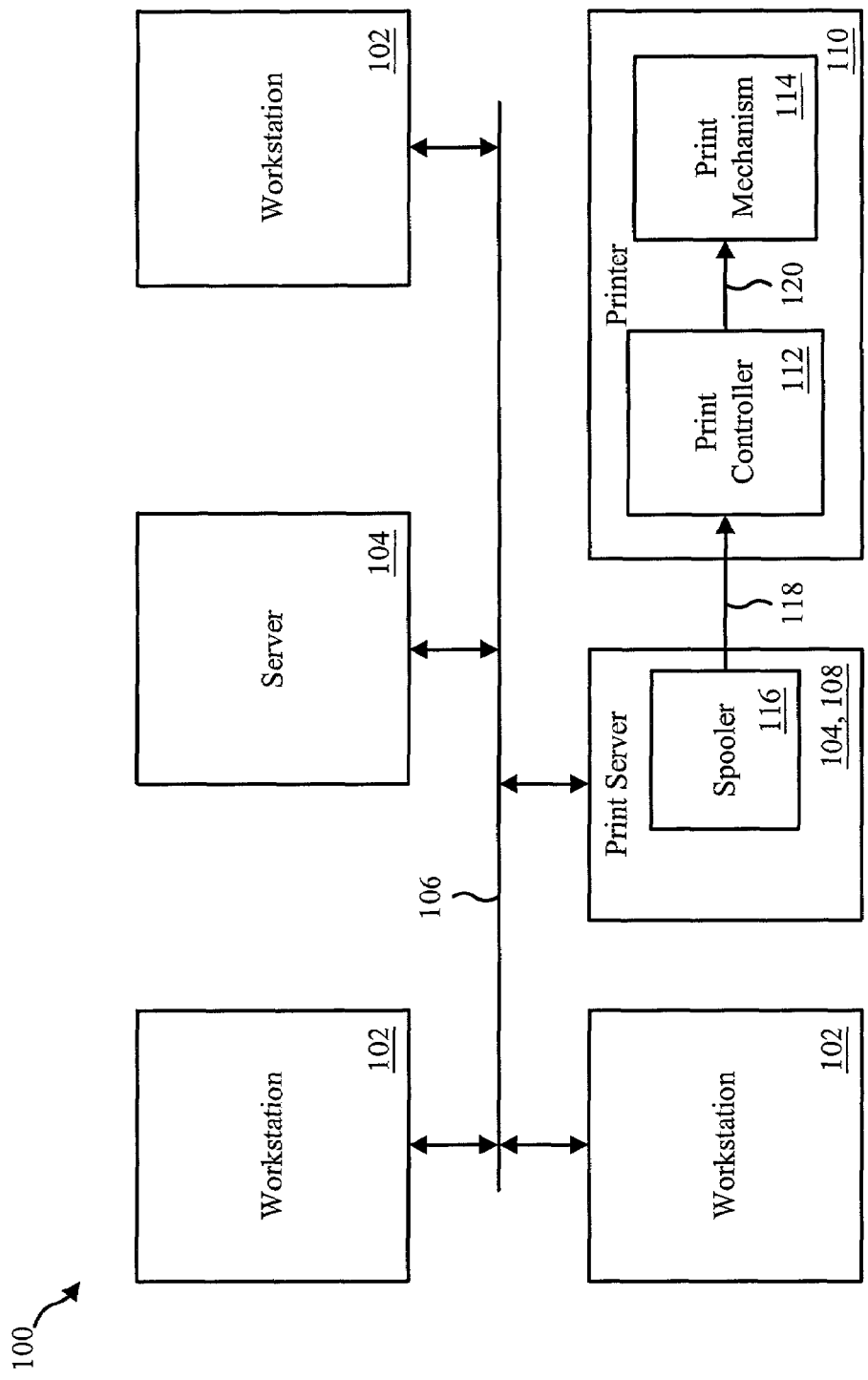
FIG. 1 is a schematic block diagram illustrating a print system in accordance with the present invention.

Referring to FIG. 1, a print system 100 illustrates a representative context for the present invention. The print system 100 includes a number of workstations 102 and servers 104 interconnected with a LAN 106. One of the servers 104 is also a print server or host 108. The print server 108 serves as a host for a printer 110. The printer 110 includes a print controller 112 and a print mechanism 114.

The users on the workstations 102, and various software tasks running on the servers 104, may generate print jobs that are sent to a print spooler 116 running on the print server 108. The print spooler 116 is typically a software process or thread running in conjunction with an operating system. The protocols and formats for specifying and sending the print jobs to the print spooler 116 may be operating system-dependent. The print spooler 116 provides means for controlling access to the printer 110.

The printer spooler 116 receives and queues various print jobs and typically provides at least one page of print data at a time to the print controller 112 within the printer 110 via a host connection 118. Typically, the print controller 112 receives pages in the form of a page description language such as IPDS, Postscript, PCL, or the like. The print controller 112 in turn converts the page descriptions into a low-level bitstream appropriate to control the print mechanism 114. The mechanism interface 120 provides the communication channel between the print controller 112 and the print mechanism 114.

Figure 2:
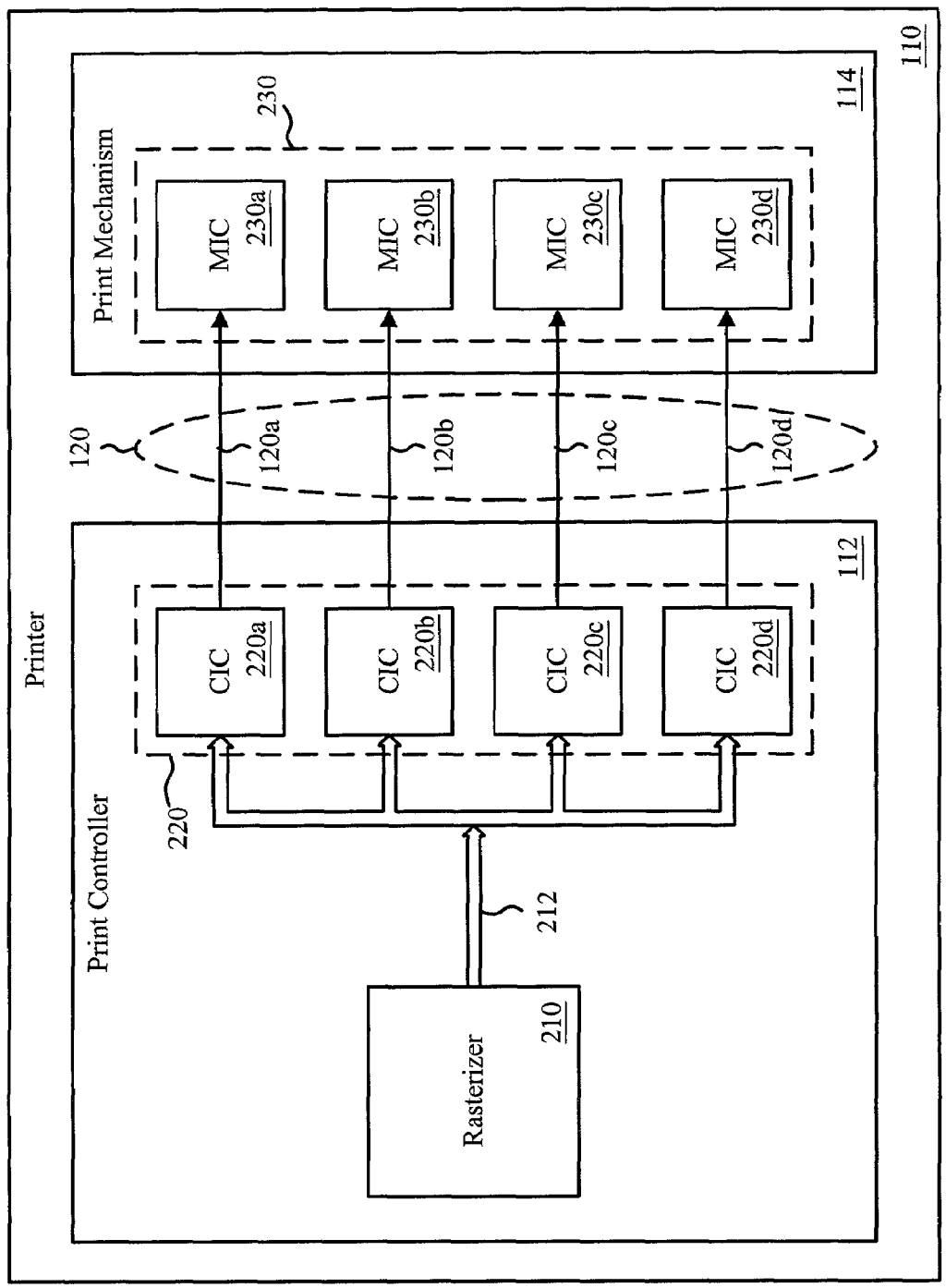
FIG. 2 is a schematic block diagram illustrating one embodiment of a printer in accordance with the present invention.

FIG. 2 illustrates the interaction of the print controller 112 and the print mechanism 114 in greater detail. The print controller 112 includes a rasterizer 210. The rasterizer 210 converts bitmap objects referenced by the page description into a raster stream 212. The raster stream 212 contains data elements corresponding to pixels.

The raster stream 212 is received by a component interface controller 220 and is transmitted to a mechanism interface controller 230 via the mechanism interface 120. In the depicted embodiment, the printer 110 is a multi-component printer, and the component interface controller 220 receives separate streams for four different colors such as cyan, magenta, yellow, and black. The component interface controller 220, the mechanism interface 120, and the mechanism interface controller 230 are partitioned into four sub-units or channels to handle the raster streams for the various components.

Figure 3:
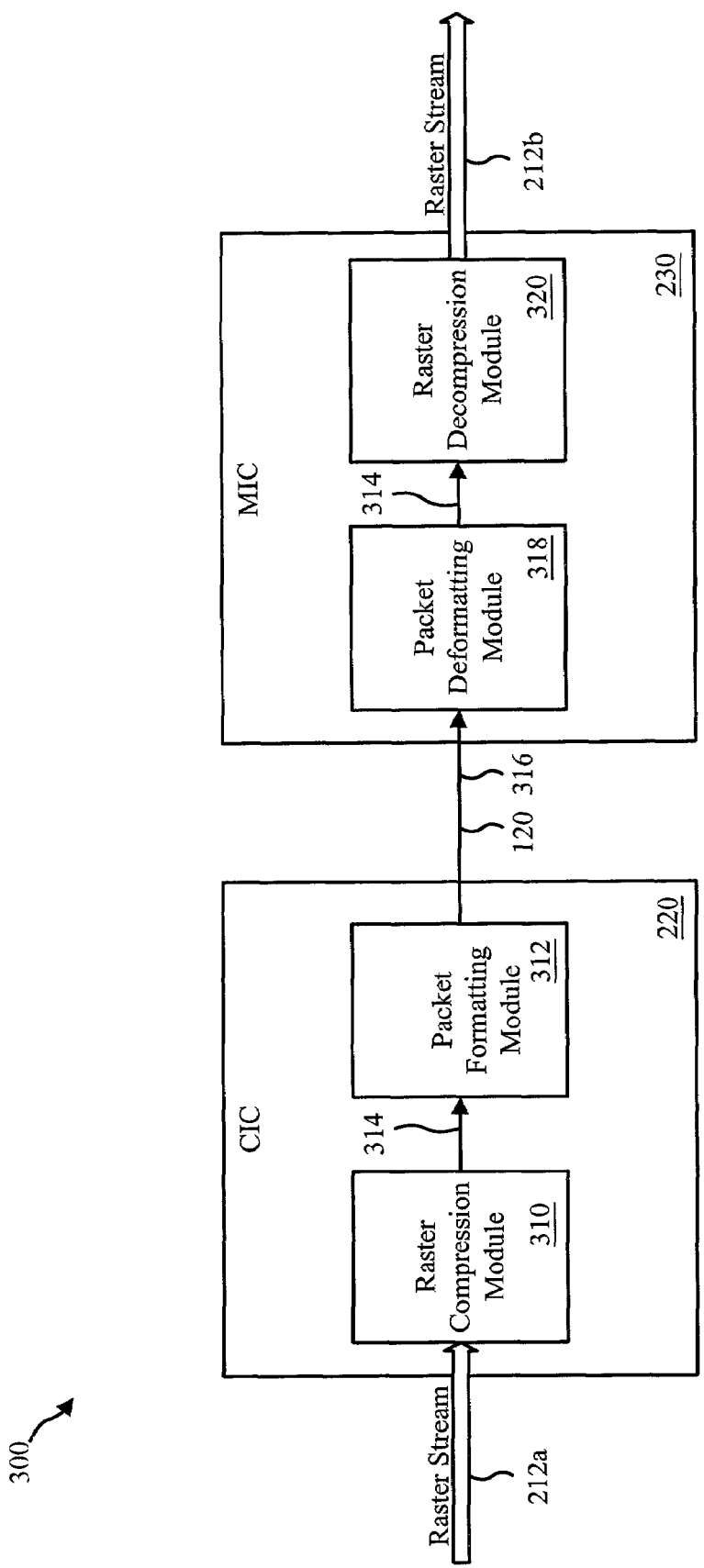
FIG. 3 is a schematic block diagram illustrating one embodiment of a raster compression system in accordance with the present invention.

FIG. 3 illustrates one embodiment of a raster compression system 300 of the present invention. The raster compression system 300 includes a CIC card 220 in electrical or optical communication with a MIC card 230. In the depicted embodiment, the CIC card is shown including a raster compression module 310 and a packet formatting module 312. The MIC card 230 is shown including a raster decompression module 310 and a packet formatting module 312. The MIC card 230 is shown including a raster decompression module 320 and a packet deformatting module 318. In the depicted embodiment, the raster compression system 330 receives a raster stream 212 of raster data that is preferably bi-toned. The raster stream 212 may be associated with a print component such as cyan, magenta, yellow or black. For example, the raster data may toggle the print mechanism between printing and not printing, thus selecting between the print component and a background color such as white.

The raster compression module 310 reduces the bit rate of the raster stream 212a and provides a compressed raster stream 314 to the packet formatting module 312, which formats the compressed raster stream 314 into packets for transmission or storage. A resulting packetized, compressed raster stream 316 is transmitted in one embodiment over the mechanism interface 120 of FIG. 2. After transmission or storage, depending upon the application, the packet deformatting module 318 receives the packetized, compressed raster stream 316 and depacketizes it. The compressed raster stream 314 is then sent to the raster decompression module 320. The raster decompression module 320 in turn converts the lower bit rate compressed raster stream 314 to the raster stream 212b. The compression and decompression conducted by the raster compression system 300 is lossless in that the data within the raster stream 212a is identical to the data within the raster stream 212b. Non-raster data such as control information may be sent over the mechanism interface 120 separate from the raster stream 212 or the compressed raster stream 314.

One objective of the raster compression system 300 is to increase the rate at which data can be rendered by the printer 110 without necessarily increasing the transfer rate of the mechanism interface 120. Another objective is to minimize the amount of processing required by the component interface controller 220 and the mechanism interface controller 230.

Figure 4:
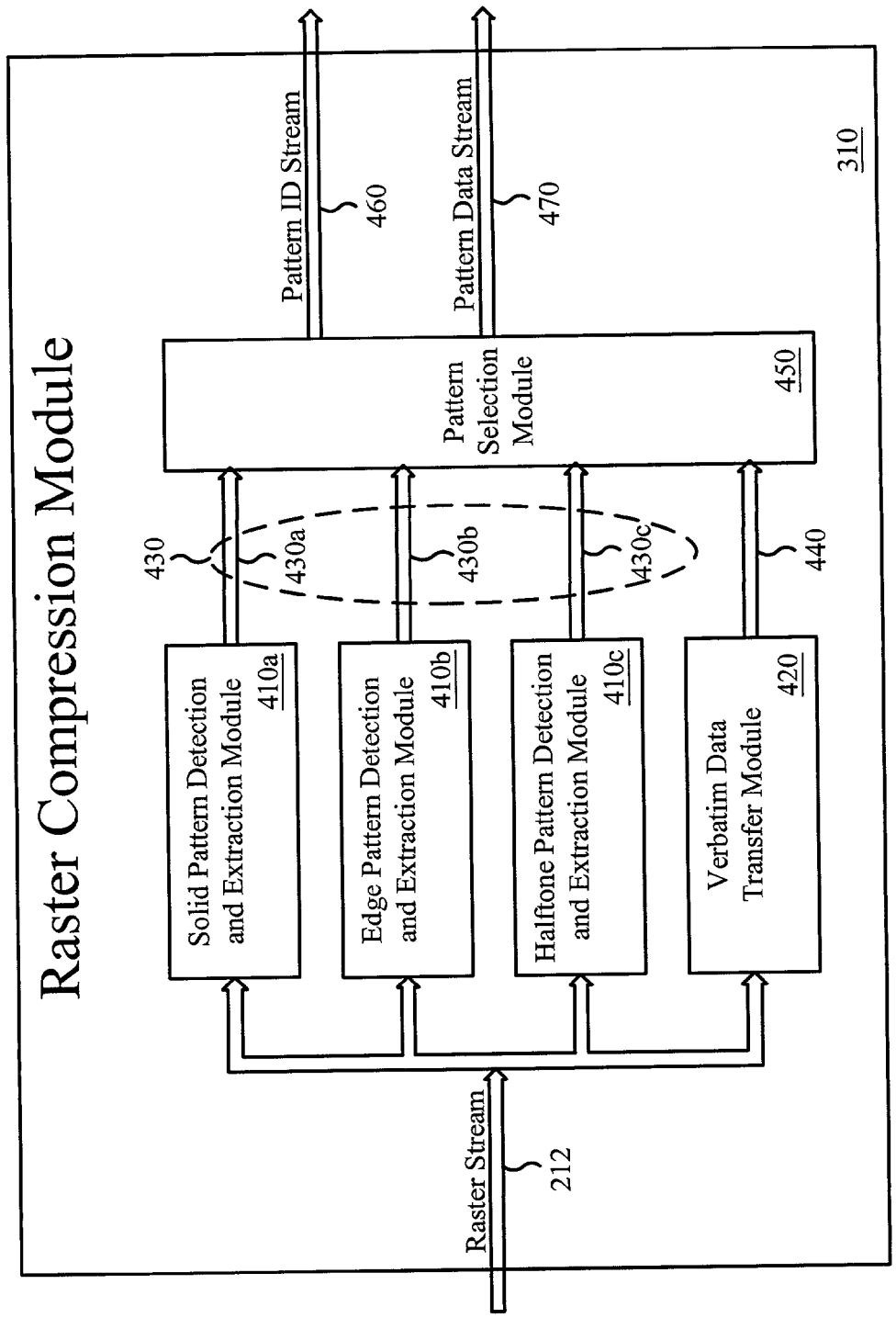
FIG. 4 is a schematic block diagram illustrating one embodiment of a raster compression module of the present invention.

Referring now to FIG. 4, one embodiment of a raster compression module 310 of the present invention includes a set of pattern detection and extraction modules 410, a verbatim data transfer module 420, and a pattern selection module 450. The pattern detection and extraction modules 410 receive the raster stream 212 and provide an attribute stream 430. The verbatim data transfer module 420 receives the raster stream 212 and provides a verbatim data stream 440. The pattern selection module 450 receives the attribute stream 430 and the verbatim data stream 440. In turn, the pattern selection module 450 transmits data for a pattern identifier stream 460 and a pattern data stream 470. The order in which detection, extraction, and selection occurs is not fixed, and may be conducted in an order other than that given here by way of example.

The pattern detection and extraction modules 410 detect patterns within data elements of the raster stream 212 in a manner that is preferably context insensitive in that little or no state information is retained between data elements. As a result of being context insensitive, the complexity of the pattern detection and extraction modules is greatly reduced. Context insensitivity also allows a raster stream to be processed in a single pass.

The width of each data element may be platform or application independent. When embodied as software, the width of the data element is preferably the word width of the processor the software is executed on. Using the native word size facilitates small machine code footprints for the pattern detection and extraction modules 410. Context insensitivity and using the native word size also increases the frequency of cache hits and look-ahead cache hits when executing the pattern detection and extraction modules 410.

When embodied as hardware, the width of the data element may be selected according to available resources. The context insensitivity of the pattern detection and extraction modules 410 reduces the need for state registers and complex control circuits. Context insensitivity also facilitates a wide range of hardware embodiments including the option to be highly pipelined.

The architecture of the raster compression module 310 facilitates a wide range of embodiments. Pattern detection and extraction modules may be added or removed without significantly affecting the other modules. In the depicted embodiment, shown by way of example, pattern detection and extraction modules for solid patterns (410a), edge patterns (410b) and half-tone patterns (410c) are included.

The pattern detection and extraction modules 410 are configured to detect the occurrence of selected patterns within a data element of the raster stream 212 and extract a set of essential attributes sufficient to losslessly represent the data element in a compressed form. The essential attributes along with an indication of detection are provided to the attribute stream 430. The bitwidths of the essential attributes provided by each pattern detection and extraction module 410 need not be the same. Some pattern detection and extraction modules may detect only a single pattern and need not provide any essential attributes.

The verbatim data transfer module 420 receives data elements within the raster stream 212 and provides those elements in "verbatim" or identical form to the verbatim data stream 440. The verbatim data stream essentially provides a "worst case" or default lossless representation. The pattern selection module 450 chooses the most appropriate lossless representation from those that are provided by the pattern detection and extraction modules 410 and the verbatim data transfer module 420.

The inclusion of the verbatim data transfer module 420 provides the raster compression module 310 with the option of transmitting data without compressing. In some embodiments and applications this may frequently be necessary. The criterion used by the pattern selection module 450 for selecting the most appropriate lossless representation may be application dependent, but as a general rule the criterion used within the raster compression module 310 is compactness (i.e. the lossless representation with the fewest number of data bits).

FIG. 5 illustrates representative example patterns processed by the raster compression module 310. The first column corresponds to particular examples of data elements within the raster stream 212. The second column shows human readable labels of patterns located within the raster stream 212 by the pattern detection and extraction modules 410. The third column shows human readable labels applied to the examples of data from the pattern data stream 470, and may be provided by the pattern selection module 450. The fourth column shows an actual binary pattern that may be used to represent data from the pattern data stream 470. The first row (neglecting the title row) represents a data element within the raster stream consisting of all ones (i.e. 1111111111111111) that is received by the detection and extraction modules 410. A pattern is detected that corresponds to a pattern identifier of 'solid' and pattern data of 'ON', that may be represented by a binary encoding such as a single one bit. In the second row, a data element consisting of three 1's followed by zeros (i.e. 1110000000000000) is received, and a pattern is detected that corresponds to a pattern identifier of 'Edge' and pattern data of 'OFF AT BIT 3', where 'OFF AT BIT 3' is represented by a binary encoding such as 00011.

In the third row, the data element 1110011111100111 is received, and a pattern is selected that corresponds to a 'Half-tone' pattern identifier and pattern data of '75% Gray', where '75% Gray' is represented with an actual pattern index such as 110000. The pattern data for half-tone patterns is preferably a pattern index or code corresponding to the index. In the last row, the data element of 1011010000110101 is received and represents data elements not fitting into other selected patterns. Accordingly, the verbatim data pattern is selected, and the data element is represented as verbatim raster data of 1011010000110101.

The illustrated patterns are preferably selected with an emphasis on low complexity. Low complexity translates to high performance (i.e. throughput) using minimal resources such as memory, processing cycles, logic gates or the like. The resulting compressed raster stream thus reduces the bandwidth and storage requirements associated with raster data.

Figure 6:
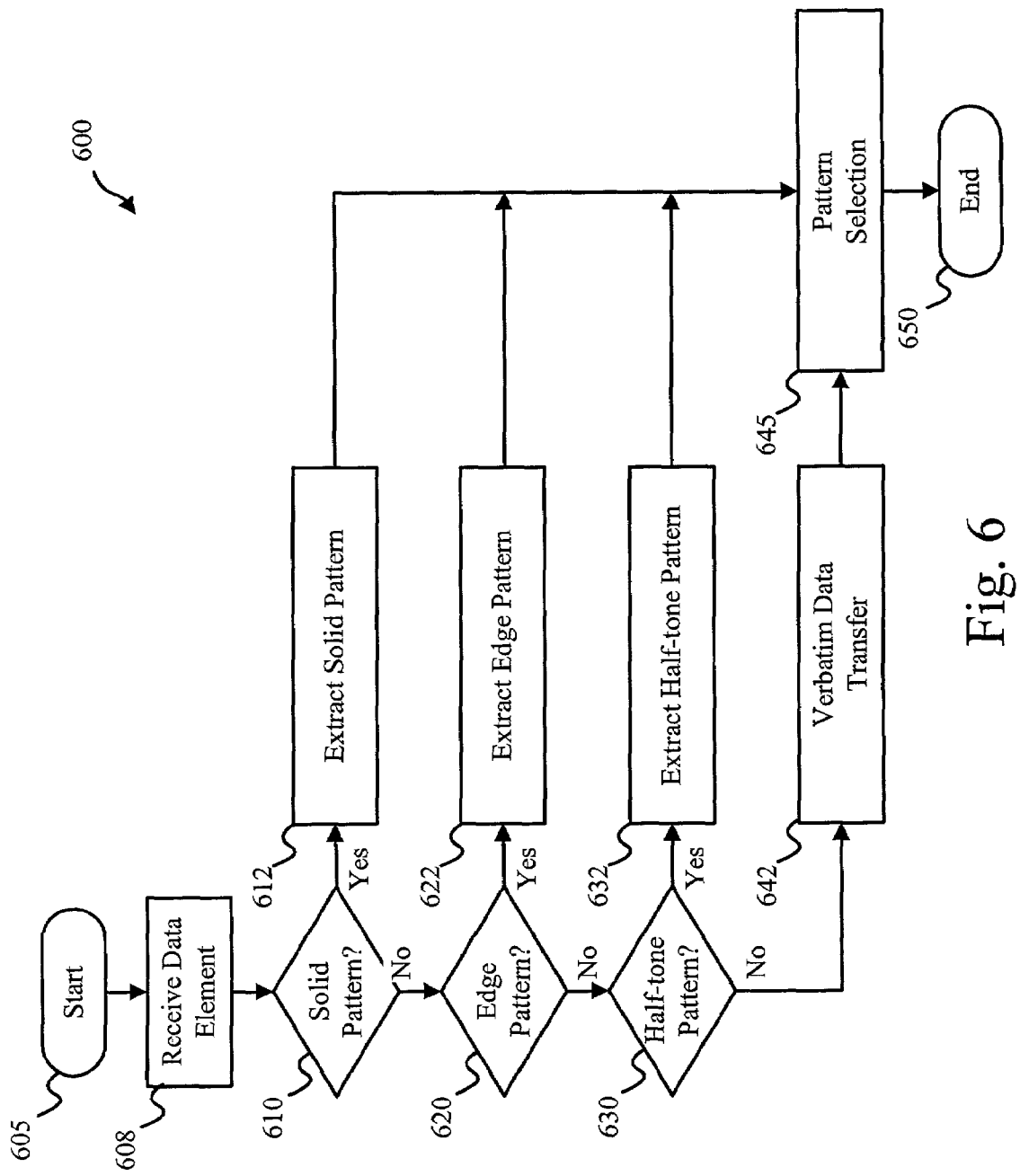
FIG. 6 is a schematic flowchart diagram illustrating the operation of one embodiment of a raster compression method of the present invention.

FIG. 6 is a schematic flowchart diagram illustrating the operation of one embodiment of a raster compression method 600 which in one embodiment is a method of operation of the raster compression module 310. Thus FIG. 6 will be described with reference to the structure of FIGS. 3 and 4 but, of course, may be practiced independent of the structure of FIGS. 3 and 4.

The raster compression method 600 starts 605, after which a data element from the raster stream 212 is received 608. The method 600 then detects 610 whether the received data element corresponds to a first pattern, comprising in the depicted embodiment a solid pattern. The detection 610 is in one embodiment conducted by the solid pattern detection and extraction module 410a. If a solid pattern such as "all zeros" or "all ones" is detected, a set of essential attributes representing the solid pattern is extracted 612 and selected 645 to provide a lossless representation of a data element from the raster stream 212.

If no solid pattern is detected, the raster compression method 600 proceeds to detect 620 whether the received data element corresponds to a second pattern. In the depicted embodiment, the second pattern is an edge pattern and the detection 620 is conducted by the edge pattern detection and extraction module 410b. If an edge pattern is detected, a set of essential attributes such as edge position and direction are extracted 622 and selected 645.

If no edge pattern is detected, the raster compression method 600 proceeds to detect 630 whether the received data element corresponds to a third pattern. In the depicted embodiment, the third pattern is a half-tone pattern and the detection 630 may be conducted by the half-tone pattern detection and extraction module 410c. If a half-tone pattern is detected, a set of essential attributes such an index corresponding to the half-tone pattern is extracted 632 and selected 645.

Many half-tone patterns are possible within various systems. However, the number of half-tone patterns actually used within a given system is preferably quite small. The set of half-tone patterns detected and extracted by the raster compression method 600 specifically, and the raster compression module 310 generally, is preferably predetermined and selected for a particular system or application. Dynamic methods for building codebooks are possible but are not preferred in that the additional complexity is counter to the objectives of the raster compression module 310.

A transfer 642 of verbatim data is activated when no particular pattern is detected in a raster data element. The transfer 642 of verbatim data provides a lossless representation that is the same as the original uncompressed raster data element.

In one embodiment, an appropriate set of essential attributes is selected 645 in response to the extracting 612, 622, or 632 and provides a lossless representation in the form of the pattern data stream 470. When selected 645, a pattern identifier such as that found in the pattern identifier stream 460 is also provided. The data within the pattern identifier stream 460 indicates which set of essential attributes was selected to provide the pattern data stream 470.

In the depicted embodiment, the detecting 610, 620, and 630 are prioritized in a particular activation order resulting in only one pattern extraction or the transfer 642 being activated for each data element. In a further embodiment, the raster compression method 600 activates the detecting 610, 620, and 630 simultaneously.

With simultaneous activation, the select 645 must arbitrate between and select the most appropriate lossless representation when more than one lossless representation is possible. The criteria used by the select 645 for selecting the best lossless representation may be application-dependent, but it is generally assumed that the raster compression method 600 selects the lossless representation requiring the fewest number of bits. After the selecting 645, the raster compression method 600 ends 650, indicating completed compression of a data element within the raster stream 212. The raster compression method 600 is preferably repeated for each data element within the raster stream 212 and terminates when no more data is presented for compression. Once again, the order of the steps of detecting, extracting, and selecting is given by way of example, and may be conducted in any suitable order.

Figure 7:
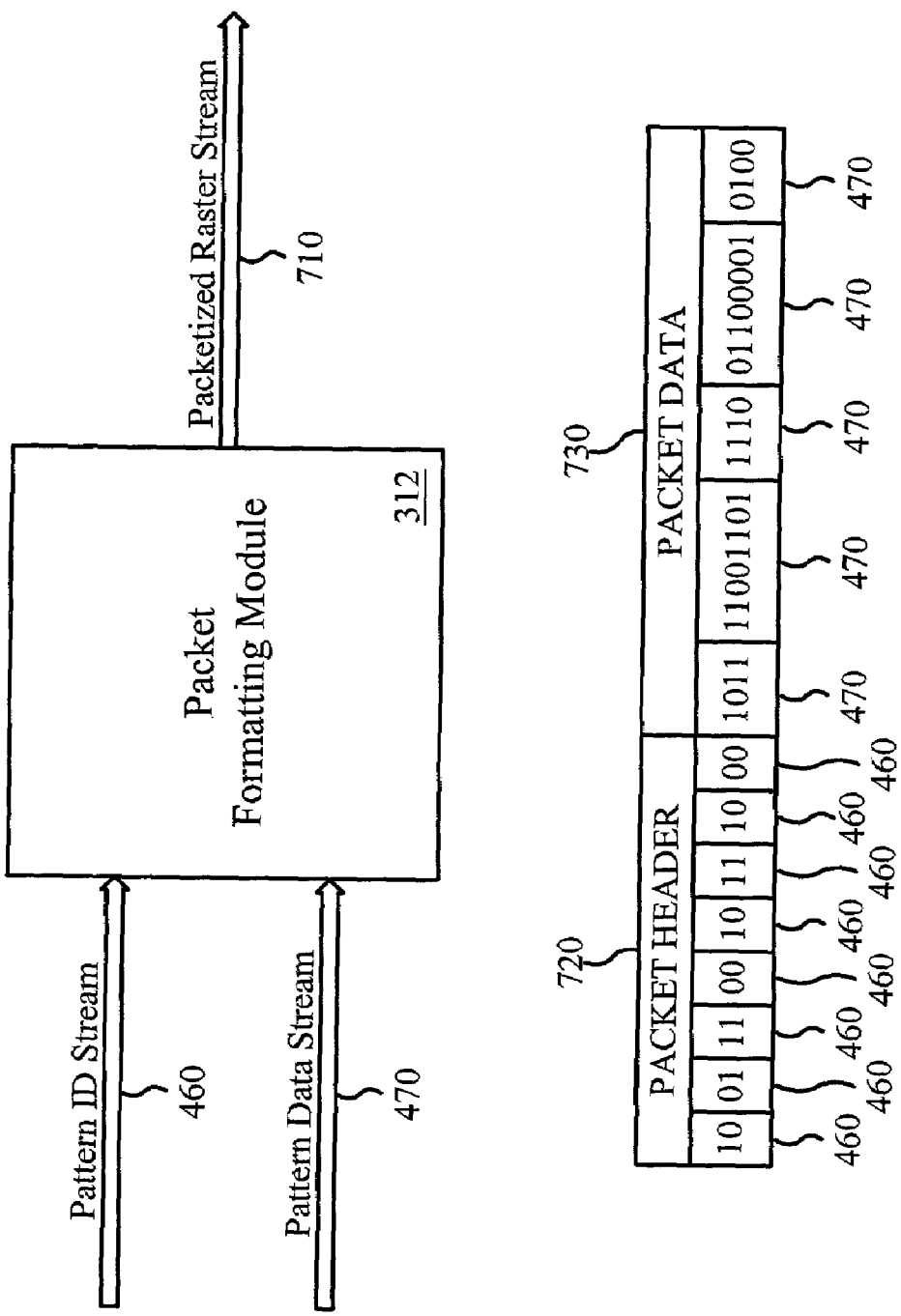
FIG. 7 is a schematic block diagram illustrating one embodiment of a raster packet formatting module of the present invention.

FIG. 7 illustrates the operation of the raster packet formatting module 312 in accordance with one embodiment of the present invention. Packet formatting is an optional operation that may be performed in conjunction with the raster compression module 310. The raster packet formatting module 312 is configured to receive sequential iterations of data within the pattern identifier stream 460 and the pattern data stream 470 to provide a packet for use within a packetized raster stream 710. Each packet provided to the packetized raster stream 710 preferably includes a packet header 720 and packet data 730.

In the preferred embodiment, the raster packet formatting module 312 is configured to concatenate a fixed number of iterations of elements within the pattern identifier stream 460 into the packet header 720 and a corresponding number of iterations of elements within the pattern data stream 470 into the packet data 730. To reduce implementation complexity and increase processing throughput related to processing packets, the fixed number is selected to create a header with a bitwidth equal to the native wordwidth of a processor or hardware subsystem. FIGS. 9a, 9b, and 9c will be discussed below to explain by way of example the encapsulation of pattern identifiers and pattern data within packets.

To maintain proper word boundaries on data within the packetized raster stream 710, the formatted packet may be appended with an arbitrary number of padding bits. The arbitrary number is selected to end the packet at a word boundary and need not be greater than or equal to the native wordwidth of the processor or hardware subsystem. Adding padding bits reduces implementation complexity and increases throughput when processing packets.

In other embodiments, the encodings used within the packet header 720 and the packet data 730 may use statistical information to further compress the raster stream 212. For example, pattern frequencies may be counted and a form of entropy encoding such as arithmetic encoding or Huffman encoding may be used. The complexity of such encoding schemes may create additional processing burdens counter to one objective of the present invention, nevertheless, entropy encoding and the like may be appropriate in certain embodiments.

Figure 8:
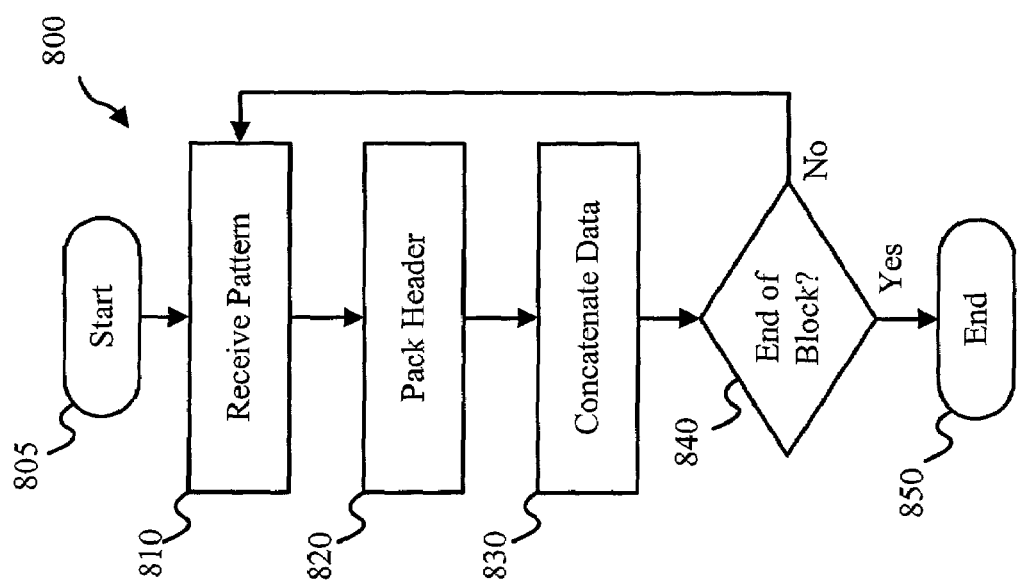
FIG. 8 is a schematic flowchart diagram illustrating one embodiment of a raster packet formatting method of the present invention.

FIG. 8 illustrates a raster packet formatting method 800, which in one embodiment is a method of operation of the raster packet formatting module 312 of FIG. 7. Of course, the method 800 may be conducted independent of the structure of FIG. 7. The raster packet formatting method 800 starts 805, and receives 810 a pattern. After receiving a pattern including information from the pattern identifier stream 460 and the pattern data stream 470, the method 800 packs 820 the header. In this step, appropriate information is placed into the packet header 720. After packing the header, data from the pattern data stream 470 and in certain embodiments the pattern identifier stream 460 is concatenated 830.

The concatenate step 830 preferably concatenates into the packet data 730 any pattern information not placed within the packet header 720. The distribution of information between the packet header and body may be influenced by the particular application and is left to those skilled in the art. In one embodiment, the data within the pattern identifier stream 460 is packed 820 into the packet header 720 and the data within the pattern data stream 470 is concatenated 830 into the packet data 730. After the concatenate 830 step is completed, an end of block assessment 840 is conducted to verify whether additional data elements can be packed into the packet header 720 and the packet data 730. If so, the method 800 returns to the beginning and continues to loop until the end of a block is reached. The method 800 then ends 850.

FIGS. 9a, 9b, and 9c illustrate several alternative examples of manners in which the packets within the packetized raster stream 710 may be formatted. FIG. 9a shows a sample format that places a header code 910a that is two bits in length within the packet header 720 for each data element encapsulated within a packet. FIGS. 9b and 9c place header codes 910b and 910c that are a single bit in length within the packet header 720. FIGS. 9a, 9b, and 9c show examples of data codes 920a, 920b, and 920c placed within the packet data 730 and the corresponding decoded raster data 930a, 930b, and 930c.

In the format of FIG. 9a, the header code 910a with a value of 00 within the packet header 720 represents a Solid OFF pattern indicating a data element containing all zeros. Likewise, the header code 910a with a value of 01 within the packet header 720 represents a Solid ON pattern indicating a data element containing all ones. In similar fashion, the header code 910a with a value of 10 within the packet header 720 indicates an edge pattern within a data element that has a single transition between ones and zeros. Finally, the header code 910a with a value of 11 indicates verbatim raster data.

In contrast to the packet header 720, the number of bits stored within the packet data 730 varies according to the pattern as shown in FIG. 9a. A solid ON pattern and a solid OFF pattern do not require a data code 920a within the packet data 730. An edge pattern requires one bit within the data code 920a to indicate a transition from zeroes to ones or ones to zeroes, and a sufficient number of additional bits to represent the bit position of the edge transition. In one example with 32 bit data elements, five additional bits are required within the data code 920a. The verbatim data utilizes the same number of bits as the original data element, since that the verbatim word is identical to the original data element.

In the format of FIG. 9b, the header code 910b that is one bit in length is stored within the packet header for each data element encapsulated within the packet. The header code 910b with a value of 0 corresponds to a solid pattern, while a header code 910b with a value of 1 corresponds to a non-solid (i.e. "other") pattern. With a solid pattern, the data code 920b that is a single bit in length within the packet data 730 indicates whether the solid pattern is all zeroes or all ones. With a non-solid pattern, the length of the data code 920b is pattern dependent. A "repeat last data element" option uses a data code 920b that is a single bit in length with a value of 0.

In the embodiment depicted in FIG. 9b, when representing an edge pattern, the data code 920b begins with a value 10, followed by a bit to indicate a transition to zeros or ones, followed by a sufficient number of additional bits to represent the bit position of the edge transition. In one example using 64 bit data elements, six additional bits are required. Verbatim raster data requires a code of 11 followed by the bits from the original data element.

In the format of FIG. 9c, the header code 910c that is a single bit in length is stored within the packet header 720 for each data element encapsulated within the packet. A header code 910c with a value of 0 corresponds to a solid pattern, while a value of 1 corresponds to a non-solid pattern (i.e. "other" pattern). With a solid pattern, the data code 920c is a single bit in length and indicates whether the solid pattern is all zeros or all ones. With a non-solid pattern, the number of bits within the data code 920c is pattern dependent. With a "repeat data element" option, the data code 920c is a single bit in length with a value of 0. Verbatim raster data requires the data code 920c to begin with a value of 1 followed by the bits from the original data element.

The particular embodiment of the raster compression module 310 implied by the format of FIG. 9c need only include those modules necessary to generate the supported patterns. As a result, the embodiment implied may have very little complexity in that only solid patterns, verbatim raster data, and an option to repeat the last data element are represented.

Figure 10:
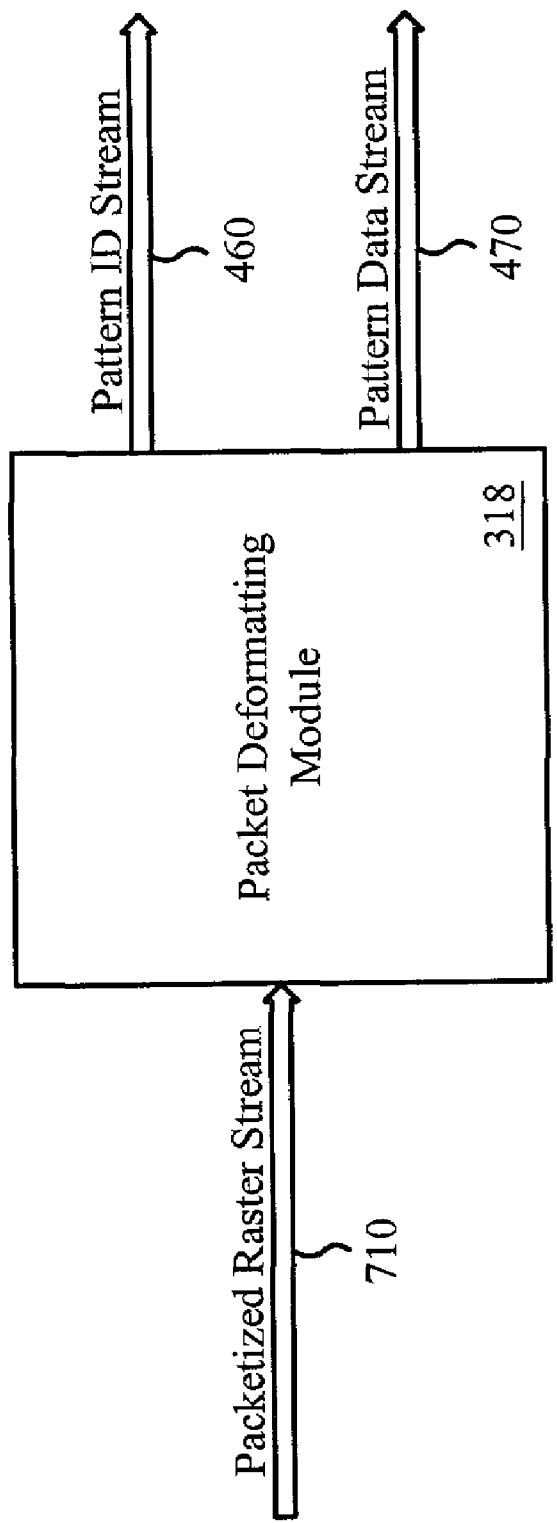
FIG. 10 is a schematic block diagram illustrating one embodiment of a raster packet deformatting module of the present invention.

FIG. 10 illustrates the operation of the raster packet deformatting module 318 of FIG. 3 in accordance with one embodiment of the present invention. The raster packet deformatting module 318 receives packets from the packetized raster stream 710. In one embodiment, the packets include the packet header 720 and the packet data 730 shown in FIG. 7. Multiple iterations of data from the pattern identifier stream 460 and the pattern data stream 470 are encapsulated within the packet header 720 and the packet data 730. The raster packet deformatting module 318 iteratively provides data for the pattern identifier stream 460 and the pattern data stream 470 from each packet within the packetized raster stream 710.

In one embodiment, the raster packet deformatting module 318 is configured to unpack from the packet header 720 a fixed number of data elements for the pattern identifier stream 460 and to also unpack from the packet data 730 a related number of data elements for the pattern data stream 470. In some instances, the data within the pattern data stream 470 may be null. The fixed number of data elements is preferably selected to create a header with a bitwidth equal to the native wordwidth of a processor or hardware subsystem.

In certain embodiments, the encodings used within the packet header 720 and the packet body 730 may include a type of entropy coding such as arithmetic encoding or Huffman encoding. The complexity of such encoding schemes may create additional processing burdens counter to the objectives of the present invention. Nevertheless, entropy encoding and the like may be appropriate in certain embodiments.

Figure 11:
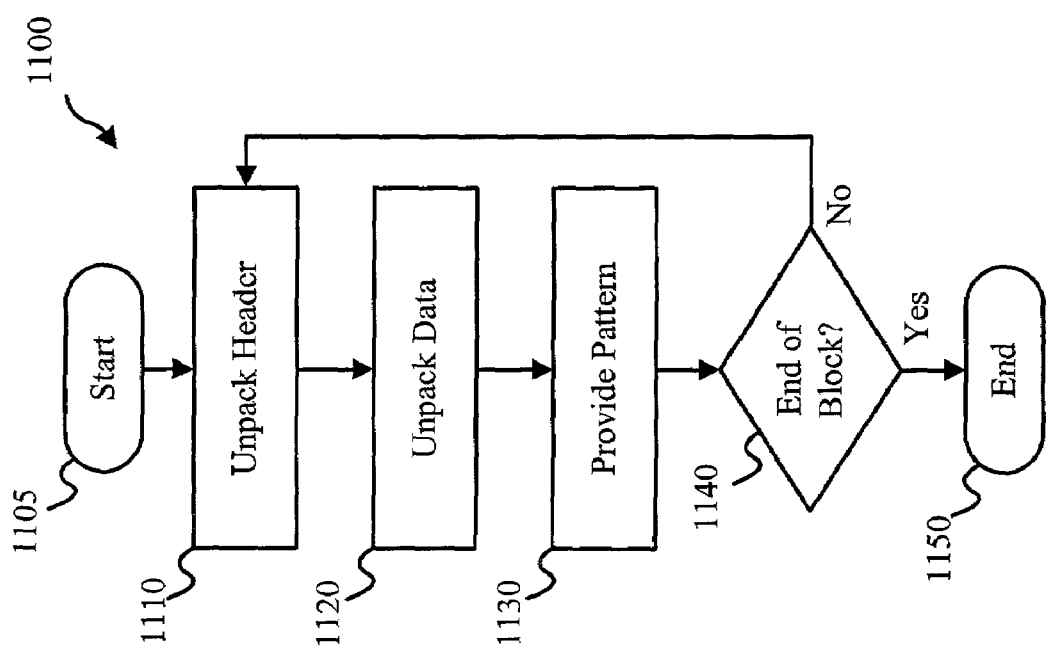
FIG. 11 is a schematic flowchart diagram illustrating the operation of one embodiment of a raster packet deformatting method of the present invention.

FIG. 11 illustrates a raster packet deformatting method 1100, which may be used as a manner of operation of the raster packet deformatting module 318. Of course, the method 1100 may also be conducted independent of the structure of FIG. 10. The raster packet deformatting method 1100 starts 1105 followed by an unpacking 1110 the header. The unpacking 1110, extracts appropriate information from the packet header 720. The unpacking 1110 is followed by unpacking 1120 data which unpacks appropriate information from the packet body 720. The unpacking 1110 and the unpacking 1120 may be adjusted according to the distribution of information between the packet header 720 and the packet data 730 as discussed previously.

After extracting the appropriate information, the raster packet deformatting method proceeds to a provide 1130 a pattern, which in one embodiment comprises providing data for the pattern identifier stream 460 and the pattern data stream 470. After the providing 1130 is completed, an end of block assessment 1140 ascertains whether additional data elements can be unpacked from the packet header 720 and the packet data 730. If additional data is available, the raster packet deformatting method 1100 loops to the unpack header 1110. Otherwise, the raster packet deformatting method 1100 ends 1150.

Figure 12:
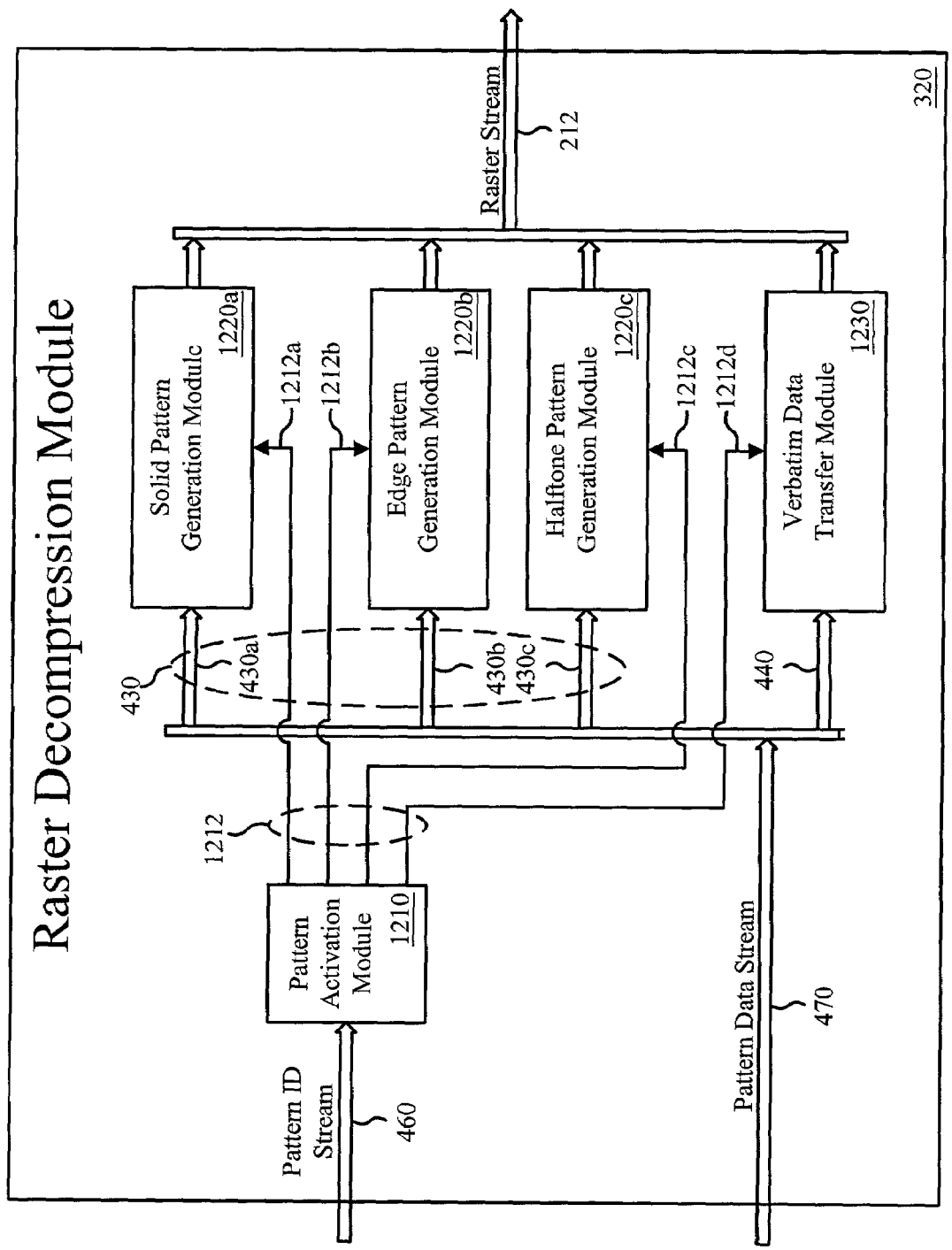
FIG. 12 is a schematic block diagram illustrating one embodiment of a raster decompression module of the present invention.

FIG. 12 illustrates one embodiment of the raster decompression module 320 of FIG. 3. The raster packet deformatting module 318 of FIG. 10 may be used in conjunction with the raster decompression module 320. A pattern activation module 1210 is configured to receive data from the pattern identifier stream 460 and to provide one or more pattern activation signals 1212. The particular pattern activation signal that is triggered preferably corresponds to data from the pattern identifier stream 460. The pattern activation signals 1212 in turn activate one of the pattern generation modules 1220 or a verbatim data transfer module 1230.

In the depicted embodiment, the pattern activation signals 1212 include the solid pattern activation signal 1212a, an edge pattern activation signal 1212b, a half-tone pattern activation signal 1212c, and a verbatim pattern (i.e. no detected pattern) activation signal 1212d. These signals activate the following modules respectively, a solid pattern generation module 1220a, an edge pattern generation module 1220b, a half-tone pattern generation module 1220c, and the verbatim data transfer module 1230. Upon activation, the pattern generation modules 1220 and the verbatim data transfer module 1230 receive data from the pattern data stream 470 and provide raster data to the raster stream 212.

The content of the pattern data stream 470 is dependent upon the pattern identifier stream 460 and corresponds to the module activated by the pattern activation module. In the depicted embodiment, the pattern data stream 470 is directed the solid attribute stream 430a, the edge attribute stream 430b, the half-tone attribute stream 430c, or the verbatim data stream 440. Each of these streams provides data that is a lossless representation of the original raster data. The pattern generation modules and the verbatim data transfer module generate and provide raster data to the raster stream 212 that is identical to the original uncompressed raster data.

Figure 13:
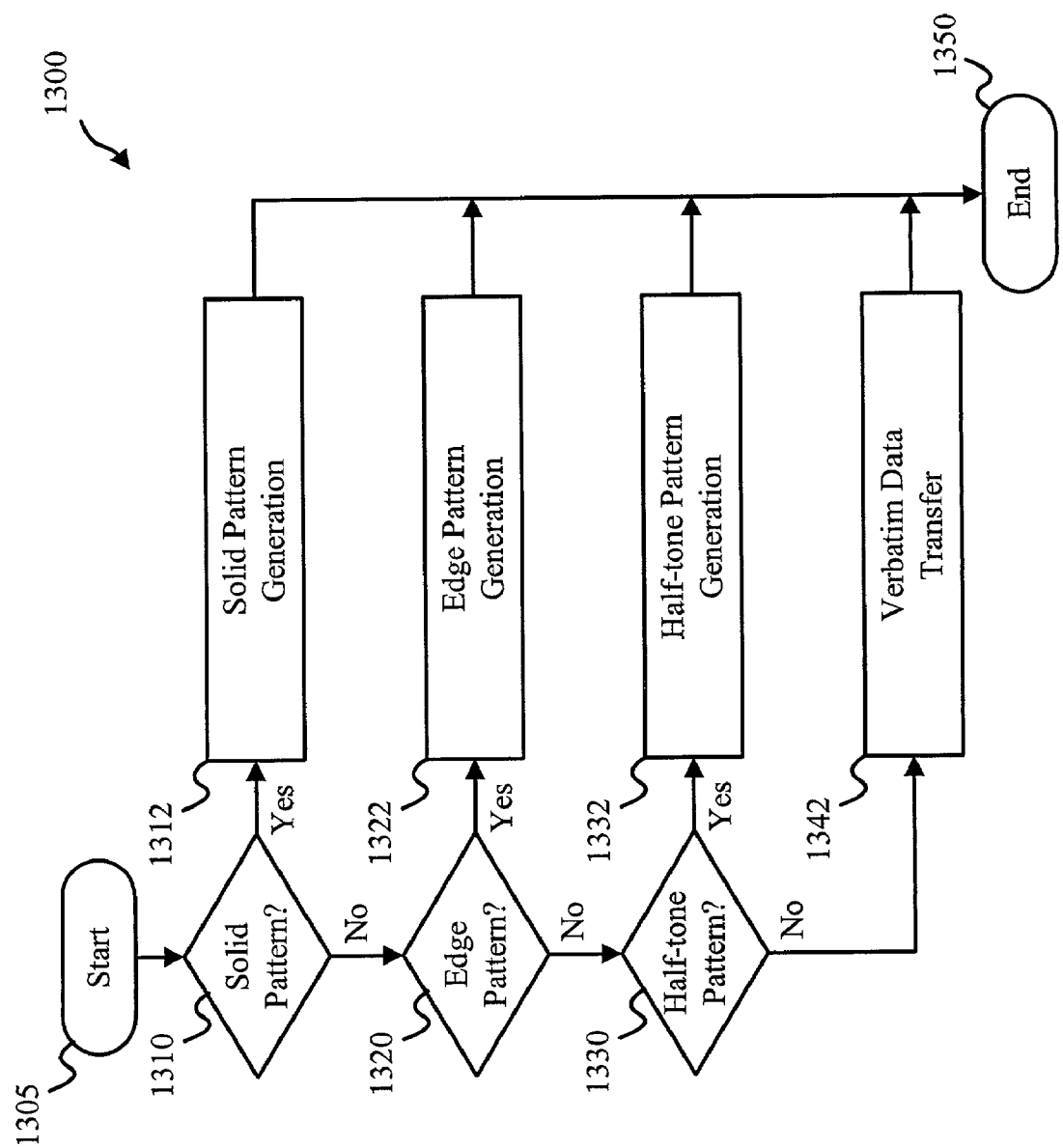
FIG. 13 is a schematic flowchart diagram illustrating the operation of one embodiment of a raster decompression method of the present invention.

FIG. 13 is a schematic flowchart diagram that illustrates a raster decompression method 1300 that corresponds to the raster decompression module 320. Of course, the method 1300 may be used independent of the particular structure depicted for the raster decompression module 320. Processing starts 1305, followed by an assessment 1310. The assessment 1310 checks whether the data from the pattern identifier stream 460 corresponds to a first pattern. In the depicted embodiment, the first pattern is a solid pattern. The assessment 1310 may be conducted by the pattern activation module 1210. If the data from the pattern identifier stream 460 indicates a solid pattern, the raster compression method proceeds to generate 1312 a solid pattern. Otherwise, the raster decompression module continues to an assessment 1320.

The assessment 1320 checks whether the data from pattern identifier stream 460 indicates a second pattern which in the depicted embodiment is an edge pattern. If so, the raster decompression method 1300 generates 1322 an edge pattern. Otherwise, the raster decompression method 1300 proceeds to an assessment 1330.

The assessment 1330 checks whether the data from pattern identifier stream 460 indicates a third pattern which in the depicted embodiment is a half-tone pattern. If so, the raster decompression method 1300 generates 1332 a half-tone pattern. Otherwise, the raster decompression method 1300 proceeds to a transfer 1342 which provides verbatim raster data.

The assessments 1310, 1320, and 1330 work together and activate the particular pattern generation that corresponds to the data from the pattern identifier stream 460. It will be obvious to one skilled in the art that other embodiments may provide the required functionality. For example, in some embodiments a jump table or "switch" statement may be used. After the generation 1312, 1322, 1332 or the transfer 1342 is completed, the raster decompression method 1300 ends 1350.

Figure 14:
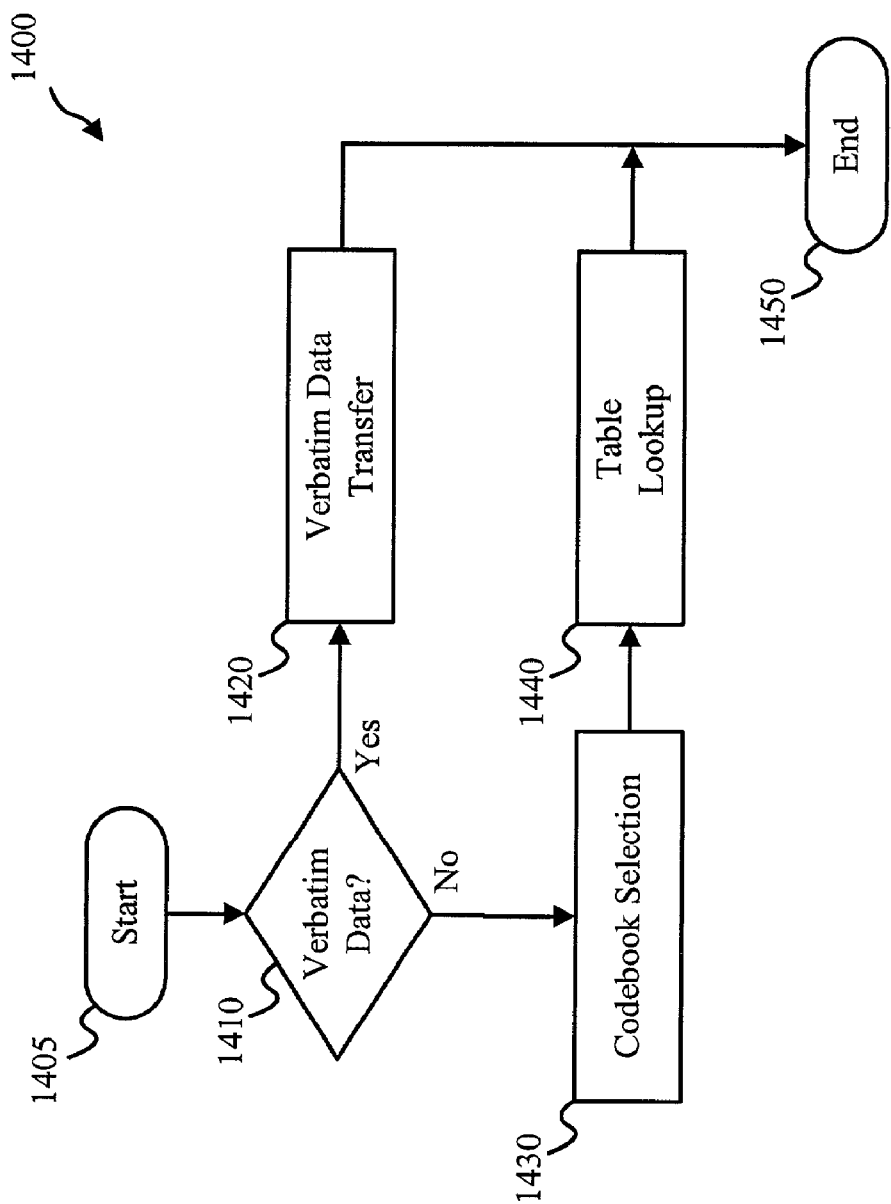
FIG. 14 is a schematic flowchart diagram illustrating the operation of a further embodiment of a raster decompression method of the present invention.

FIG. 14 illustrates a further embodiment of a raster decompression method 1400 corresponding to the raster decompression module 320. The raster decompression method 1400 starts 1405 and proceeds to an assessment 1410, which checks whether the data from the pattern identifier stream 460 corresponds to verbatim data. If so, the method proceeds to a transfer 1420 which provides verbatim raster data. Otherwise, a codebook is selected 1430 as determined by the pattern identifier stream 460.

After the codebook is selected 1430, a table lookup 1440 is performed. The table lookup 1440 uses the pattern data 470 as an index into the selected codebook. Given that the bitwidth of the pattern data 470 is dependent on the data from pattern identifier stream 460, the size of the codebook selected may vary. Upon completion of the table lookup 1440 or the transfer 1420, the raster decompression method 1400 ends 1450.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. An apparatus for lossless compression of bi-tonal raster data, the apparatus comprising:
    a data channel configured to carry a raster data stream from a print controller to a print mechanism;
    a plurality of pattern detection modules, including an edge pattern detection module, operably connected to the data channel and configured to receive raster data, each of the pattern detection modules further configured to detect a separate type of pattern in the raster data, each pattern capable of a separate lossless representation; and
    a formatting module configured to place the lossless representations into a compressed data stream, and to segment the compressed data stream into a plurality of packets, each packet comprising a fixed length header field and a variable length data field.

2. The apparatus of claim 1, further comprising a pattern selection module configured to select the lossless representation that is most compact.

3. The apparatus of claim 1, wherein one of the patterns comprises verbatim data, and further comprising a verbatim data transfer module configured to receive raster data, and provide verbatim raster data, the verbatim raster data being an identical and lossless representation of the raster data.

4. The apparatus of claim 1, wherein the plurality of pattern detection modules further comprises a solid pattern detection module.

5. The apparatus of claim 1, wherein the plurality of pattern detection modules further comprises a half-tone pattern detection module.

6. The apparatus of claim 1, wherein the fixed length header field is configured to contain a plurality of codes representing a plurality of pattern types corresponding to the plurality of pattern detection modules.

7. The apparatus of claim 6, wherein the plurality of codes comprises a 00 code representing a solid ON pattern, a 01 code representing a solid OFF pattern, a 10 code representing an edge pattern, and a 11 code representing verbatim raster data.

8. The method of claim 6, wherein the plurality of codes comprises a 0 code representing solid patterns, and 1 code representing other patterns.

9. The apparatus of claim 1, further comprising a plurality of pattern extraction modules configured to extract the selected lossless representations from the data channel.

10. The apparatus of claim 1, wherein the pattern detection modules and the formatting module are configured to detect and format the raster data in a single pass.

11. An apparatus for decompressing losslessly compressed bi-tonal raster data, the apparatus comprising:
a data channel configured to carry a compressed raster data stream from a print controller to a print mechanism;
a plurality of decompression modules operably connected to the data channel and configured to generate raster data from compressed raster data, one of the decompression modules being a verbatim data transfer module configured to generate raster data that is identical to the compressed raster data, another decompression module being an edge pattern generation module;
a pattern decoding module configured to receive a pattern identifier and activate one of the plurality of decompression modules; and
a deformatting module configured to parse packets, each packet comprising a fixed length header field and a variable length data field.

12. The apparatus of claim 11, wherein the plurality of pattern generators further comprises a solid pattern generator.

13. The apparatus of claim 11, wherein the plurality of pattern generators further comprises a half-tone pattern generator.

14. The apparatus of claim 11, wherein the fixed length header field is configured to contain a plurality of codes representing a plurality of patterns corresponding to the plurality of decompression modules.

15. The apparatus of claim 14, wherein the plurality of codes comprises a 00 code representing a solid ON pattern, a 01 code representing a solid OFF pattern, a 10 code representing an edge pattern, and a 11 code representing verbatim raster data.

16. The method of claim 15, wherein the plurality of codes comprises a 0 code representing solid patterns, and a 1 code representing other patterns.

17. A method for lossless compression of bi-tonal raster data, the method comprising:
receiving a raster data stream containing raster data from a print controller;
detecting a plurality of patterns in the raster data, including edge patterns;
generating lossless representations of the raster data based upon the plurality of patterns; and
formatting the lossless representations into packets, each packet comprising a fixed length header field and a variable length data field.

18. The method of claim 17, wherein detecting a plurality of patterns and generating the lossless representations are conducted in a single pass.

19. The method of claim 17, wherein detecting a plurality of patterns further comprises detecting solid patterns.

20. The method of claim 17, wherein detecting a plurality of patterns further comprises detecting half-tone patterns.

21. The method of claim 17, further comprising selecting the lossless representations to be generated based upon a criterion of compactness.

22. The method of claim 17, wherein formatting the compressed raster stream further comprises placing a plurality of codes in the packets, each code of the plurality of codes representing one of a plurality of patterns.

23. The method of claim 22, wherein the plurality of codes comprises a 00 code representing a solid ON pattern, a 01 code representing a solid OFF pattern, a 10 code representing an edge pattern, and a 11 code representing verbatim raster data.

24. The method of claim 22, wherein the plurality of codes comprises a 0 code representing solid patterns, and 1 code representing other patterns.

25. A method for decompressing losslessly compressed bi-tonal raster data, the method comprising:
receiving a pattern identifier and pattern data from a print controller;
providing a plurality of pattern generation procedures including an edge pattern generation procedure;
executing a pattern generation procedure selected according to the pattern identifier to provide decompressed raster data from the pattern data; and
deformatting the packets, including deformatting a fixed length header field and a variable length data field.

26. The method of claim 25, wherein executing a pattern generation procedure comprises executing a solid pattern generation procedure.

27. The method of claim 25, wherein executing a pattern generation procedure comprises executing a half-tone pattern generation procedure.

28. The method of claim 27, wherein executing the half-tone pattern generation procedure comprises indexing a codebook.

29. The method of claim 25, wherein the fixed length header field is configured to contain a plurality of codes representing a plurality of patterns corresponding to the plurality of decompression modules.

30. The method of claim 29, wherein the plurality of codes comprises a 00 code representing a solid ON pattern, a 01 code representing a solid OFF pattern, a 10 code representing an edge pattern, and a 11 code representing verbatim raster data.

31. The method of claim 29, wherein the plurality of codes comprises a 0 code representing solid patterns, and a 1 code representing other patterns.

* * * * *